US012561968B2

(12) United States Patent　　　(10) Patent No.:　US 12,561,968 B2
Ihara　　　　　　　　　　　　　　　(45) Date of Patent:　Feb. 24, 2026

(54) LEARNING DEVICE, LEARNING METHOD, AND LEARNING PROGRAM

(71) Applicant: FUJIFILM CORPORATION, Tokyo (JP)

(72) Inventor: Satoshi Ihara, Tokyo (JP)

(73) Assignee: FUJIFILM CORPORATION, Tokyo (JP)

( * ) Notice:　Subject to any disclaimer, the term of this patent is extended or adjusted under 35 U.S.C. 154(b) by 314 days.

(21) Appl. No.: 18/483,532

(22) Filed:　Oct. 10, 2023

(65)　　　　　　Prior Publication Data

US 2024/0037927 A1　　Feb. 1, 2024

Related U.S. Application Data

(63) Continuation　of　application　No. PCT/JP2022/017507, filed on Apr. 11, 2022.

(30)　　　Foreign Application Priority Data

Apr. 16, 2021　(JP) ................................. 2021-069869

(51) Int. Cl.
　　*G06V 10/82*　　　(2022.01)
　　*G06V 10/764*　　(2022.01)
(52) U.S. Cl.
　　CPC ............ *G06V 10/82* (2022.01); *G06V 10/764* (2022.01)
(58) Field of Classification Search
　　None
　　See application file for complete search history.

(56)　　　　　　References Cited

U.S. PATENT DOCUMENTS

| | | | |
|---|---|---|---|
| 2016/0140438 A1 | 5/2016 | Yang et al. | |
| 2020/0226748 A1 | 7/2020 | Kaufman et al. | |
| 2020/0401851 A1 | 12/2020 | Mau et al. | |
| 2021/0279521 A1 | 9/2021 | Mau et al. | |
| 2021/0374462 A1* | 12/2021 | Yamazaki ............ | G06V 10/454 |

FOREIGN PATENT DOCUMENTS

| | | |
|---|---|---|
| JP | 2018-503161 A | 2/2018 |
| JP | 2019-505063 A | 2/2019 |
| JP | 2019-067299 A | 4/2019 |
| JP | 2019-152543 A | 9/2019 |
| JP | 2020-525127 A | 8/2020 |

OTHER PUBLICATIONS

International Search Report issued in International Application No. PCT/JP2022/017507 on Jun. 21, 2022.
Written Opinion of the ISA issued in International Application No. PCT/JP2022/017507 on Jun. 21, 2022.

* cited by examiner

*Primary Examiner* — Leon Flores
(74) *Attorney, Agent, or Firm* — SOLARIS Intellectual Property Group, PLLC

(57)　　　　　　ABSTRACT

A processor is configured to: acquire training data that consists of a learning expression medium and a correct answer label for at least one of a plurality of types of classes included in the learning expression medium; input the learning expression medium to a neural network such that probabilities that each class included in the learning expression medium will be each of the plurality of types of classes are output; integrate the probabilities that each class will be each of the plurality of types of classes on the basis of classes classified by the correct answer label of the training data; and train the neural network on the basis of a loss derived from the integrated probability and the correct answer label of the training data.

5 Claims, 10 Drawing Sheets

20

LEARNING DEVICE

21

INFORMATION
ACQUISITION UNIT

22

LEARNING UNIT 30A          30C          30B  30

FIG. 7

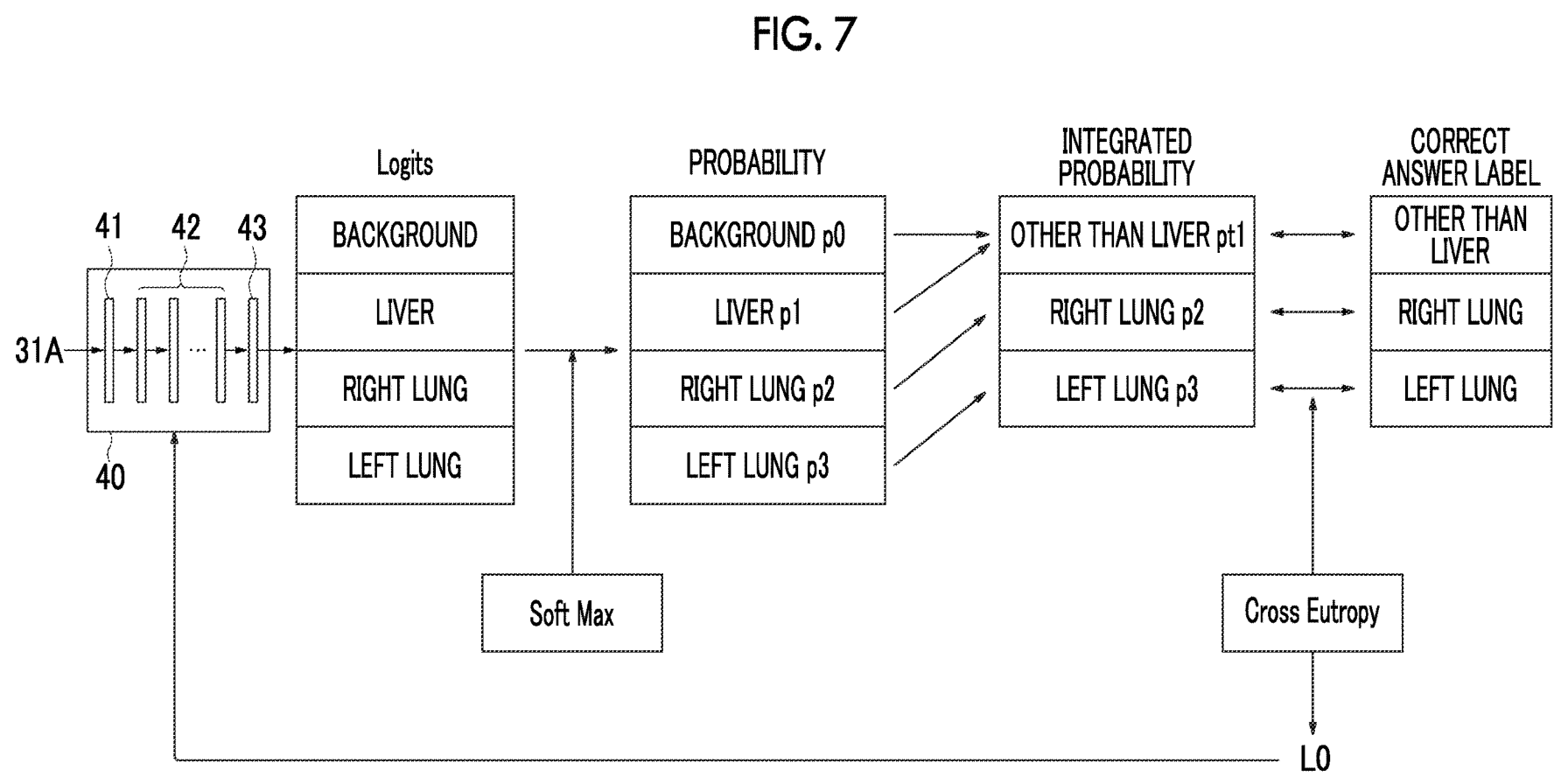

Logits

| BACKGROUND |
| LIVER |
| RIGHT LUNG |
| LEFT LUNG |

Soft Max

PROBABILITY

| BACKGROUND p0 |
| LIVER p1 |
| RIGHT LUNG p2 |
| LEFT LUNG p3 |

INTEGRATED PROBABILITY

| OTHER THAN LIVER pt1 |
| RIGHT LUNG p2 |
| LEFT LUNG p3 |

CORRECT ANSWER LABEL

| OTHER THAN LIVER |
| RIGHT LUNG |
| LEFT LUNG |

Cross Entropy

LEARNING DEVICE, LEARNING METHOD, AND LEARNING PROGRAM

CROSS-REFERENCE TO RELATED APPLICATIONS

This application is a continuation of International Application No. PCT/JP2022/017507, filed on Apr. 11, 2022, which claims priority from Japanese Patent Application No. 2021-069869, filed on Apr. 16, 2021. The entire disclosure of each of the above applications is incorporated herein by reference.

BACKGROUND

Technical Field

The present disclosure relates to a learning device, a learning method, and a learning program.

Related Art

In recent years, a machine learning technology using deep learning has attracted attention. In particular, various methods have been proposed that train a convolutional neural network (hereinafter, referred to as a CNN), which is one of multi-layer neural networks in which a plurality of processing layers are hierarchically connected, with deep learning and classify an image into desired regions using the trained neural network constructed by training (see, for example, JP2019-067299A and JP2019-505063A).

Meanwhile, in a case in which an image is classified into a plurality of types of regions, a trained neural network may be prepared for each type of region. It is also possible to classify the image into the plurality of types of regions using one trained neural network. For example, in a case in which an image of the chest and abdomen of a human body is classified into a liver region and a lung region at once, a neural network for classifying the liver region and a neural network for classifying the lung region may be combined to construct a trained neural network that classifies the liver region and the lung region at once. In order to construct the trained neural network, it is necessary to prepare a correct answer label in which the liver region and the lung region are specified in a learning image.

In addition, in some cases, a user wants to construct a trained neural network that classifies lungs into five lobe regions of an upper lobe of a right lung, a middle lobe of the right lung, a lower lobe of the right lung, an upper lobe of a left lung, and a lower lobe of the left lung in an image including the lungs. In this case, in order to train the neural network, it is necessary to prepare a correct answer label in which each of the five lobes is specified in the learning image.

Here, since a trained neural network that classifies only the liver region and a trained neural network that classifies only the lung region are known, it is possible to prepare a large number of correct answer labels in which only the liver region has been specified and a large number of correct answer labels in which only the lung region has been specified. However, a correct answer label in which both the liver region and the lung region have been specified imposes a heavy burden on a creator who creates training data. For this reason, at present, it is not possible to prepare a sufficiently large amount of training data for learning the classification of the liver and the lung at once to train the neural network with high accuracy. In addition, it is possible to prepare a large number of correct answer labels in which the lung region has been specified. However, the correct answer label in which each of the five lobes of the lung has been specified also imposes a heavy burden on the creator who creates the training data. For this reason, at present, it is not possible to prepare a sufficiently large amount of training data for learning the classification of the five lobes of the lung at once to train the neural network with high accuracy. This problem also occurs in a case in which a trained neural network that classifies not only a medical image but also an expression medium, such as a photographic image, a video image, voice, or text, into a plurality of types of classes is constructed.

SUMMARY OF THE INVENTION

The present disclosure has been made in view of the above circumstances, and an object of the present disclosure is to provide a technique that can construct a trained neural network capable of classifying an expression medium into a plurality of types of classes even in a case in which it is not possible to prepare a large amount of training data for learning classification of the plurality of types of classes at once.

According to an aspect of the present disclosure, there is provided a learning device for performing machine learning on a neural network that classifies an expression medium into three or more types of classes. The learning device comprises at least one processor. The processor is configured to: acquire training data that consists of a learning expression medium and a correct answer label for at least one of a plurality of types of classes included in the learning expression medium; input the learning expression medium to the neural network such that probabilities that each class included in the learning expression medium will be each of the plurality of types of classes are output; integrate the probabilities that each class will be each of the plurality of types of classes on the basis of classes classified by the correct answer label of the training data; and train the neural network on the basis of a loss derived from the integrated probability and the correct answer label of the training data.

The "expression medium" is a medium that can be expressed by a computer, and examples of the expression medium include a still image, a video image, voice, and text.

In addition, in the learning device according to the aspect of the present disclosure, the expression medium may be an image. The plurality of types of classes may be a plurality of regions including a background in the image. The processor may be configured to add probabilities of classes other than the class classified by the correct answer label for the learning expression medium and a probability of the background among the probabilities that each class will be the plurality of types of classes to integrate the probabilities that each class will be each of the plurality of types of classes.

Further, in the learning device according to the aspect of the present disclosure, the classes classified by the correct answer label may include two or more of the plurality of types of classes, and the processor may be configured to add probabilities of the two or more classes classified by the correct answer label among the probabilities that the classes will be the plurality of types of classes to integrate the probabilities that each class will be each of the plurality of types of classes.

Furthermore, in the learning device according to the aspect of the present disclosure, the processor may be configured to train the neural network using a plurality of training data items having different correct answer labels.

According to another aspect of the present disclosure, there is provided a learning method for performing machine learning on a neural network that classifies an expression medium into three or more types of classes. The learning method comprises: acquiring training data that consists of a learning expression medium and a correct answer label for at least one of a plurality of types of classes included in the learning expression medium; inputting the learning expression medium to the neural network such that probabilities that each class included in the learning expression medium will be each of the plurality of types of classes are output; integrating the probabilities that each class will be each of the plurality of types of classes on the basis of classes classified by the correct answer label of the training data; and training the neural network on the basis of a loss derived from the integrated probability and the correct answer label of the training data.

According to still another aspect of the present disclosure, there is provided a learning device for performing machine learning on a neural network that classifies a region in an image into three or more types of classes. The learning device comprises at least one processor. The processor is configured to: acquire training data that consists of a learning image and a correct answer label for at least one of a plurality of types of regions included in the learning image; input the learning image to the neural network such that probabilities that each region included in the learning image will be each of the plurality of types of classes are output; integrate the probabilities that each region will be each of the plurality of types of classes on the basis of classes classified by the correct answer label of the training data; and training the neural network on the basis of a loss derived from the integrated probability and the correct answer label of the training data.

According to yet another aspect of the present disclosure, there is provided a learning method for performing machine learning on a neural network that classifies a region in an image into three or more types of classes. The learning method comprises: acquiring training data that consists of a learning image and a correct answer label for at least one of a plurality of types of regions included in the learning image; inputting the learning image to the neural network such that probabilities that each region included in the learning image will be each of the plurality of types of classes are output; integrating the probabilities that each region will be each of the plurality of types of classes on the basis of classes classified by the correct answer label of the training data; and training the neural network on the basis of a loss derived from the integrated probability and the correct answer label of the training data.

In addition, programs that cause a computer to perform the learning methods according to the two aspects of the present disclosure may be provided.

According to the present disclosure, it is possible to construct a trained neural network that can classify an expression medium into a plurality of types of classes even in a case in which it is not possible to prepare a large amount of training data for learning the classification of the plurality of types of classes at once.

BRIEF DESCRIPTION OF THE DRAWINGS

FIG. 7 is a diagram schematically illustrating the training of the neural network according to the first embodiment.

FIG. 11 is a diagram schematically illustrating training of a neural network according to the second embodiment.

DESCRIPTION OF THE PREFERRED EMBODIMENTS

Figure 1:
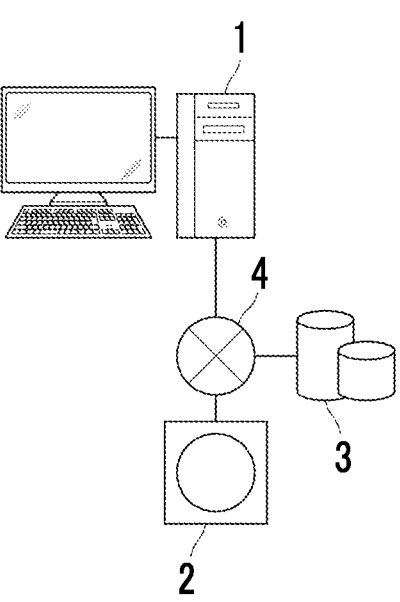
FIG. 1 is a diagram illustrating a schematic configuration of a medical information system to which a learning device according to a first embodiment of the present disclosure is applied.

Hereinafter, embodiments of the present disclosure will be described with reference to the drawings. First, a configuration of a medical information system to which a learning device according to a first embodiment is applied will be described. FIG. 1 is a diagram illustrating a schematic configuration of the medical information system. In the medical information system illustrated in FIG. 1, a computer 1 including the learning device according to this embodiment, an imaging apparatus 2, and an image storage server 3 are connected via a network 4 such that they can communicate with one another.

The computer 1 includes the learning device according to this embodiment, and a learning program according to the first embodiment is installed in the computer 1. The computer 1 may be a workstation or a personal computer that is directly operated by a doctor who performs diagnosis or may be a server computer that is connected to them through the network. The learning program is stored in a storage device of the server computer connected to the network or in a network storage to be accessible from the outside, and is downloaded and installed in the computer 1 used by the doctor in response to a request. Alternatively, the learning program is recorded on a recording medium, such as a digital versatile disc (DVD) or a compact disc read only memory (CD-ROM), is distributed, and is installed in the computer 1 from the recording medium.

The imaging apparatus 2 is an apparatus that images a diagnosis target part of a subject and generates a three-dimensional image indicating the part and is specifically a computed tomography (CT) apparatus, a magnetic resonance imaging (MRI) apparatus, a positron emission tomography (PET) apparatus, or the like. The three-dimensional image, which has been generated by the imaging apparatus 2 and consists of a plurality of slice images, is transmitted to the image storage server 3 and is then stored therein. In addition, in this embodiment, the imaging apparatus 2 is a CT apparatus and generates, for example, a CT image of the chest and abdomen of a patient.

The image storage server 3 is a computer that stores and manages various types of data and comprises a high-capacity external storage device and database management software. The image storage server 3 performs communication with other apparatuses through the wired or wireless network 4 to transmit and receive, for example, image data. Specifically, the image storage server 3 acquires various types of data including the image data of the three-dimensional image generated by the imaging apparatus 2 through the network, stores the acquired data in a recording medium, such as a high-capacity external storage device, and manages the data. In addition, the storage format of the image data and the communication between the apparatuses through the network 4 are based on a protocol such as digital imaging and communication in medicine (DICOM). Further, the image storage server 3 also stores training data which will be described below.

Figure 2:
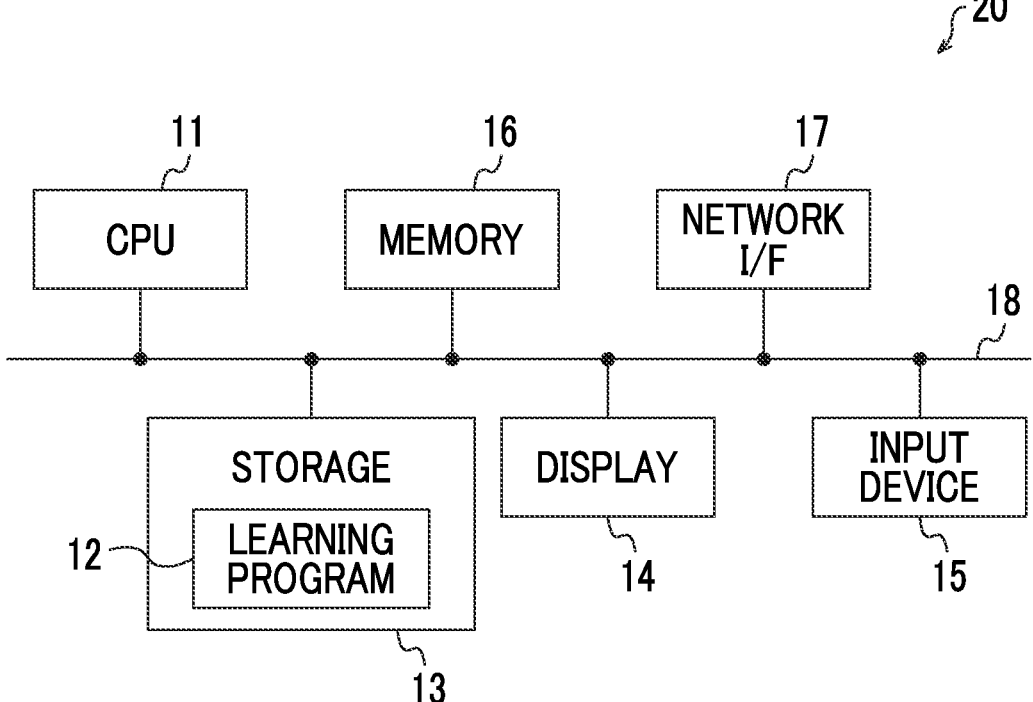
FIG. 2 is a diagram illustrating a schematic configuration of the learning device according to the first embodiment.

Next, the learning device according to the first embodiment will be described. FIG. 2 illustrates a hardware configuration of the learning device according to the first embodiment. As illustrated in FIG. 2, a learning device 20 includes a central processing unit (CPU) 11, a non-volatile storage 13, and a memory 16 as a transitory storage area. In addition, the learning device 20 includes a display 14, such as a liquid crystal display, an input device 15, such as a keyboard and a mouse, and a network interface (I/F) 17 that is connected to the network 4. The CPU 11, the storage 13, the display 14, the input device 15, the memory 16, and the network OF 17 are connected to a bus 18. The CPU 11 is an example of a processor according to the present disclosure.

The storage 13 is implemented by, for example, a hard disk drive (HDD), a solid state drive (SSD), and a flash memory. A learning program 12 is stored in the storage 13 as a storage medium. The CPU 11 reads the learning program 12 from the storage 13, develops the read learning program 12 into the memory 16, and executes the developed learning program 12.

Figures 3, 4:
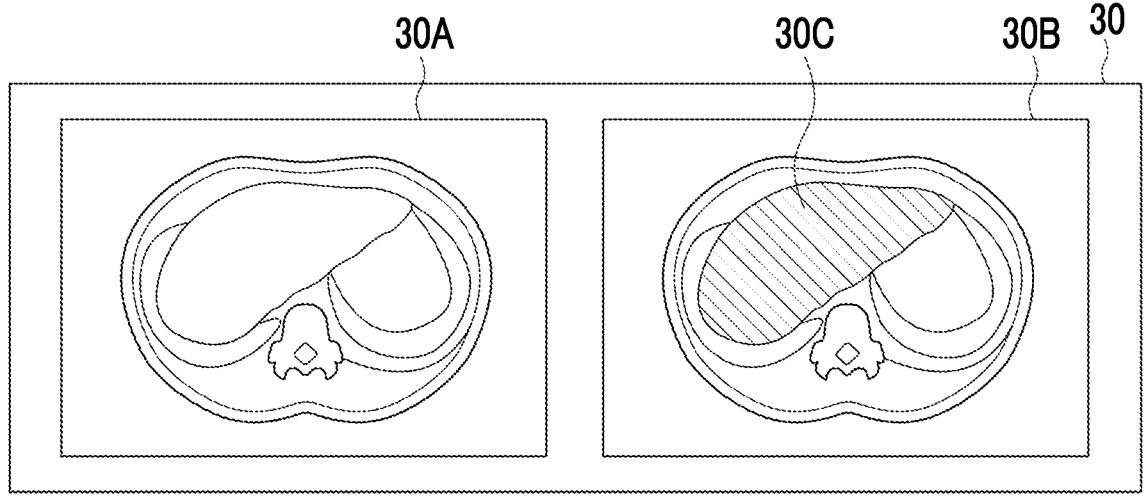
FIG. 3 is a diagram illustrating a functional configuration of the learning device according to the first embodiment.
FIG. 4 is a diagram illustrating training data for learning classification of a liver region.

Next, a functional configuration of the learning device according to the first embodiment will be described. FIG. 3 is a diagram illustrating the functional configuration of the learning device according to the first embodiment. As illustrated in FIG. 3, the learning device 20 comprises an information acquisition unit 21 and a learning unit 22. Then, the CPU 11 executes the learning program 12 to function as the information acquisition unit 21 and the learning unit 22.

Here, it is assumed that the learning device 20 according to the first embodiment constructs a trained network that classifies a lung region and a liver region included in a CT image. For this purpose, the learning unit 22 trains a neural network using training data. In addition, the CT image is an example of an expression medium, and the lung region, the liver region, and a background are an example of a plurality of types of classes according to the present disclosure.

The information acquisition unit 21 acquires training data from the image storage server 3 in response to an instruction input by the operator through the input device 15. In a case in which a plurality of training data items are acquired from the image storage server 3 and stored in the storage 13, the information acquisition unit 21 acquires the training data from the storage 13.

FIG. 4 is a diagram illustrating training data for learning the classification of the liver region. As illustrated in FIG. 4, training data 30 includes a learning image 30A and a correct answer label 30B. The learning image 30A is one of a plurality of slice images constituting the CT image. The learning image 30A includes regions of the liver, the lung, and the like. In the correct answer label 30B, a label 30C is given to the liver region included in the learning image 30A.

In addition, in FIG. 4, the giving of the label is represented by hatching. The learning image is an example of a learning expression medium.

Figure 5:
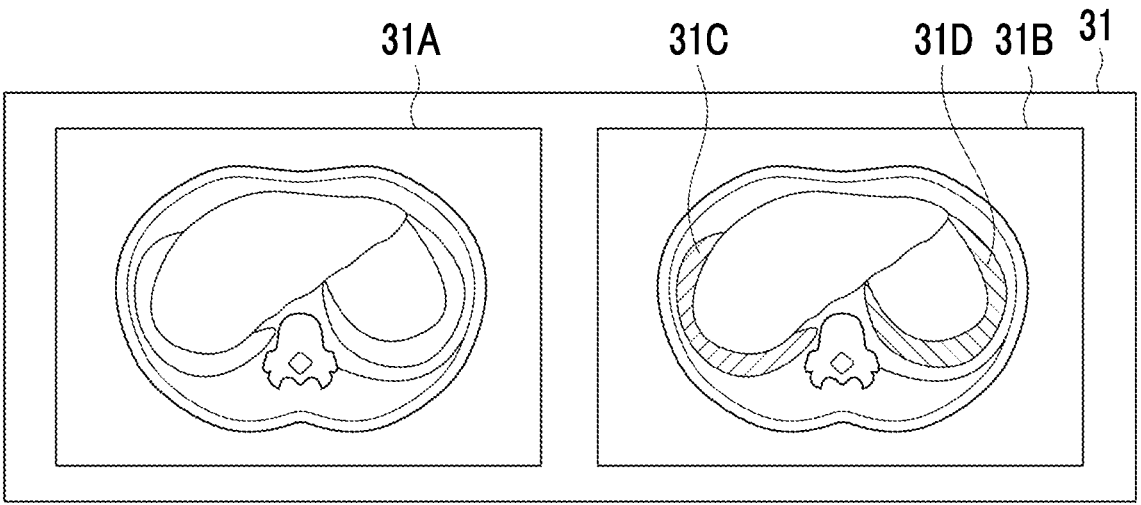
FIG. 5 is a diagram illustrating training data for learning classification of a lung region.

FIG. 5 is a diagram illustrating training data for learning the classification of the lung region. As illustrated in FIG. 5, training data 31 includes a learning image 31A and a correct answer label 31B. The learning image 31A is the same tomographic image as the learning image 30A and includes regions of the liver, the lung, and the like. In the correct answer label 31B, labels are given to the lung regions included in the learning image 31A. Specifically, a label 31C is given to a right lung region, and a label 31D is given to a left lung region.

Figure 6:
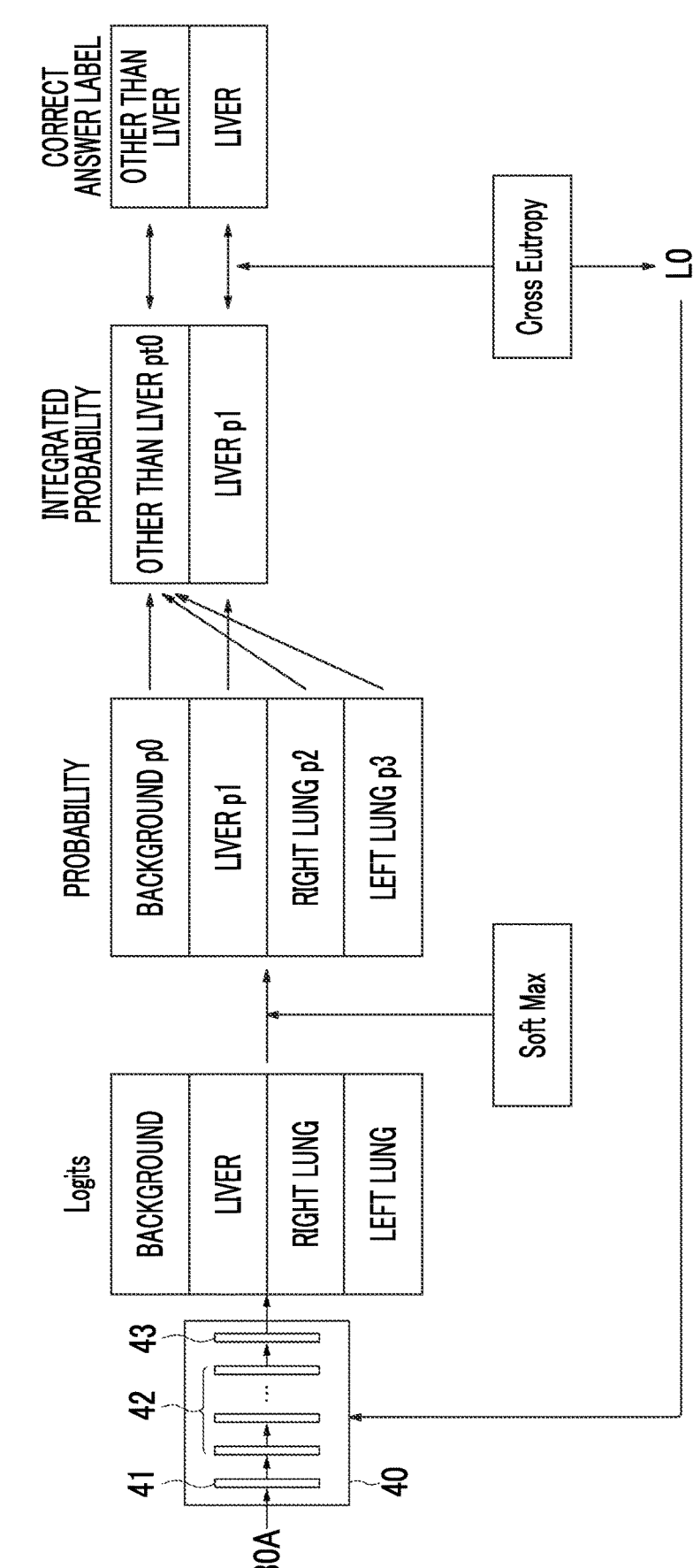
FIG. 6 is a diagram schematically illustrating training of a neural network according to the first embodiment.

The learning unit 22 trains the neural network using the training data. FIG. 6 is a diagram schematically illustrating the training of the neural network in the first embodiment. As illustrated in FIG. 6, a neural network 40 to be trained is, for example, a convolutional neural network and consists of an input layer 41, a plurality of middle layers 42, and an output layer 43. In the middle layer 42, convolutional layers and pooling layers (which are not illustrated) are alternately disposed. A learning image is input to the neural network 40, and logits, which are values indicating the likelihoods that each pixel included in the learning image will be each of the background, the liver, the right lung, and the left lung, are output from the neural network 40. The logits are the output of the neural network 40. As the values of the logits are larger, the possibilities that each pixel will be the target regions are higher. For example, the logits having values of (1.0, 5.0, 2.0, 1.5) are output for the background, the liver, the right lung, and the left lung.

The learning unit 22 applies a softmax activation function (Soft Max) to the logits output from the neural network 40 to convert the logits into probabilities p0 to p3. For example, values, such as probabilities $(p0, p1, p2, p3)=(0.1, 0.8, 0, 0.1)$, are obtained for the background, the liver, the right lung, and the left lung. Since $(p0, p1, p2, p3)$ are probabilities, $p0+p1+p2+p3=1$ is established.

Here, in the correct answer label 30B of the training data 30, a label 30C is only given to the liver region. In addition, in the correct answer label 31B of the training data 31, labels 31C and 31D are only given to the left lung and the right lung, respectively. Therefore, the learning unit 22 integrates the derived probabilities on the basis of the classes classified by the correct answer label of the training data. For example, in a case in which the learning image 30A illustrated in FIG. 4 is input to the neural network 40, the learning image 30A is included in the training data 30 for learning the classification of the liver region. Therefore, the learning unit 22 integrates the probabilities of the background, the right lung, and the left lung other than the liver among the derived probabilities to derive an integrated probability pt0. In this case, $pt0=p0+p2+p3$ is established. Therefore, in a case in which the probabilities $(p0, p1, p2, p3)=(0.1, 0.8, 0, 0.1)$ is established, an integrated probability $(pt0, p1)=(0.2, 0.8)$ is established.

The learning unit 22 derives a cross entropy error as a loss L0 using a probability distribution on the basis of the integrated probability and the correct answer label. The cross entropy error corresponds to a distance between the probability distribution and a vector represented by the correct answer label. Here, in a case in which a label is given to the liver region in the correct answer label of the input learning image, the vector of the correct answer label for deriving the loss L0 from the integrated probability $(pt0, p1)$ is $(0, 1)$.

On the other hand, as illustrated in FIG. 7, in a case in which the learning image 31A illustrated in FIG. 4 is input to the neural network 40, the learning image 31A is included in the training data 31 for learning the classification of the right lung region and the left lung region. Therefore, the learning unit 22 integrates the probabilities of the background and the liver other than the lung among the derived probabilities to derive an integrated probability pt1. In this case, pt1=p0+p1 is established. Therefore, in a case in which the probabilities (p0, p1, p2, p3)=(0.1, 0.8, 0, 0.1) is established, an integrated probability (pt1, p2, p3)=(0.9, 0, 0, 1) is established.

In addition, in a case in which labels are given to the left lung region and the right lung region in the correct answer label of the input learning image, the vector of the correct answer label for deriving the loss L0 from the integrated probability distribution is (0, 1, 0) in the case of the right lung and is (0, 0, 1) in the case of the left lung.

The learning unit 22 trains the neural network 40 until the loss L0 satisfies an end condition. Specifically, the learning unit 22 derives parameters, such as the number of convolutional layers, the number of pooling layers, coefficients of a kernel, and the size of the kernel in the middle layer 42 included in the neural network 40, to perform machine learning on the neural network 40. The end condition may be that the loss L0 is equal to or less than a predetermined threshold value or may be that learning is performed a predetermined number of times.

Figure 8:
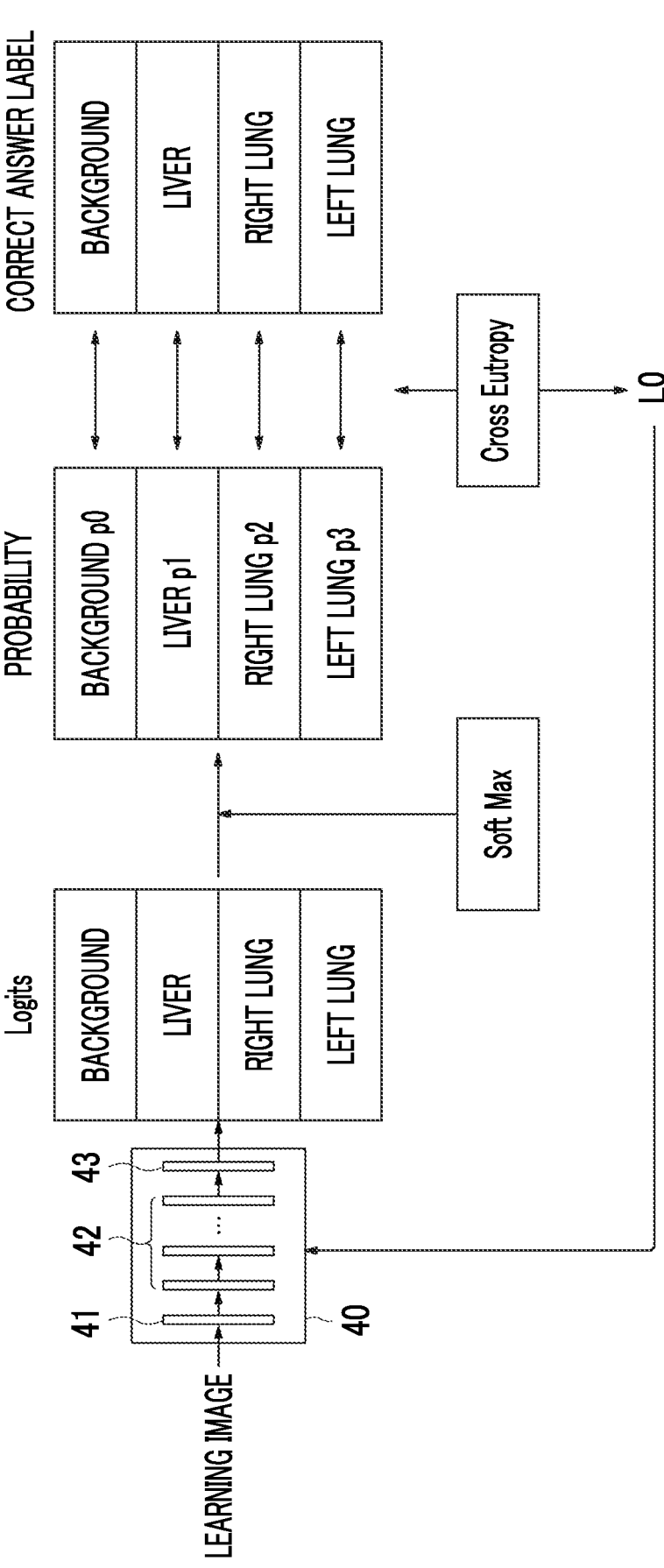
FIG. 8 is a diagram schematically illustrating the training of the neural network according to the first embodiment.

In addition, in a case in which labels are given to the liver, the right lung, and the left lung in the correct answer label of the learning image input to the neural network 40, the learning unit 22 integrates the probabilities (p0, p1, p2, p3) as illustrated in FIG. 8 to derive the loss L0 from the correct answer label and trains the neural network 40. In this case, the vector of the correct answer label is (1, 0, 0, 0) in the case of the background, is (0, 1, 0, 0) in the case of the liver, is (0, 0, 1, 0) in the case of the right lung, and is (0, 0, 0, 1) in the case of left lung.

In a case in which a CT image is input to the trained neural network constructed by machine learning, the trained neural network outputs the probabilities that each pixel of the CT image will be the liver region, the right lung region, the left lung region, and the background. Therefore, the use of the trained neural network constructed by the learning device according to the first embodiment makes it possible to classify the CT image into a region having the maximum probability for each pixel.

Figure 9:
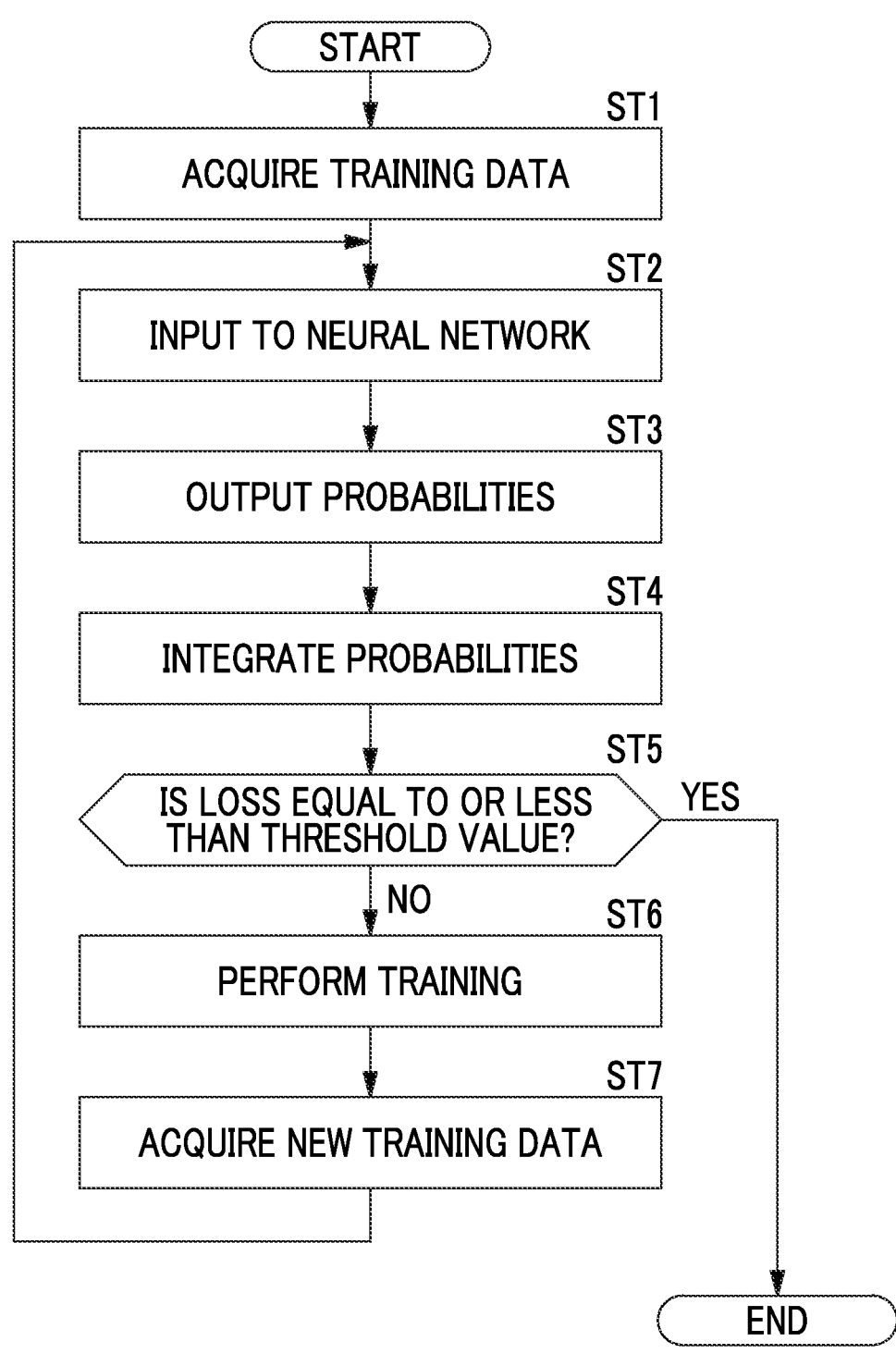
FIG. 9 is a flowchart illustrating a learning process performed in the first embodiment.

Next, a process performed in the first embodiment will be described. FIG. 9 is a flowchart illustrating the process performed in the first embodiment. In addition, it is assumed that a plurality of training data items are acquired from the image storage server 3 and stored in the storage 13. Further, it is assumed that the learning end condition is that the loss L0 is equal to or less than the threshold value.

First, the information acquisition unit 21 acquires the training data stored in the storage 13 (Step ST1). Then, the learning unit 22 inputs the learning image included in the training data to the neural network 40 (Step ST2) such that the neural network 40 outputs the probabilities that a region in the learning image will be each of a plurality of types of classes (Step ST3). Further, the learning unit 22 integrates the probabilities that the region will be each of the plurality of types of classes on the basis of the classes classified by the correct answer label of the training data (Step ST4). Then, the learning unit 22 determines whether or not the loss L0 is equal to or less than the threshold value (Step ST5). In a case in which the determination result in Step ST5 is "No", the learning unit 22 trains the neural network on the basis of the loss L0 derived from the integrated probability and the correct answer label of the training data (Step ST6).

Further, the information acquisition unit 21 acquires new training data (Step ST7), the process returns to the process in Step ST2, and the processes in Steps ST2 to ST5 are repeated. In a case in which the determination result in Step ST5 is "Yes", the process ends.

As described above, in the first embodiment, the probabilities that the region in the learning image will be each of the plurality of types of classes, which have been output from the neural network, are integrated on the basis of the classes classified by the correct answer label of the training data, and the neural network is trained on the basis of the loss derived from the integrated probability and the correct answer label of the training data. Therefore, it is possible to construct a trained neural network that classifies a region in an image into a plurality of types of classes using the training data even in a case in which the correct answer label of the learning image is not classified into each of the plurality of types of classes.

For example, it is possible to construct a trained neural network that classifies a region in an image into three or more types of classes, such as the liver, the lung, and the background, using the training data including the correct answer label in which the label is given only to the liver region or the correct answer label in which the label is given only to the lung region. Therefore, it is not necessary to create a large number of correct answer labels including all of the labels of the plurality of types of classes. As a result, it is possible to reduce the burden on the creator in a case in which training data is created. In addition, even though there is only training data including the correct answer label in which the label is given only to a region corresponding to one of the plurality of types of classes, it is possible to construct a trained neural network that classifies the region in the image into the plurality of types of classes in a case in which there is training data including the correct answer label in which the label is given to a region corresponding to a different class.

Next, a second embodiment of the present disclosure will be described. In addition, since a configuration of a learning device according to the second embodiment is the same as the configuration of the learning device according to the first embodiment, detailed description of the device will not be repeated here. The second embodiment differs from the first embodiment in a probability integration process.

Figure 10:
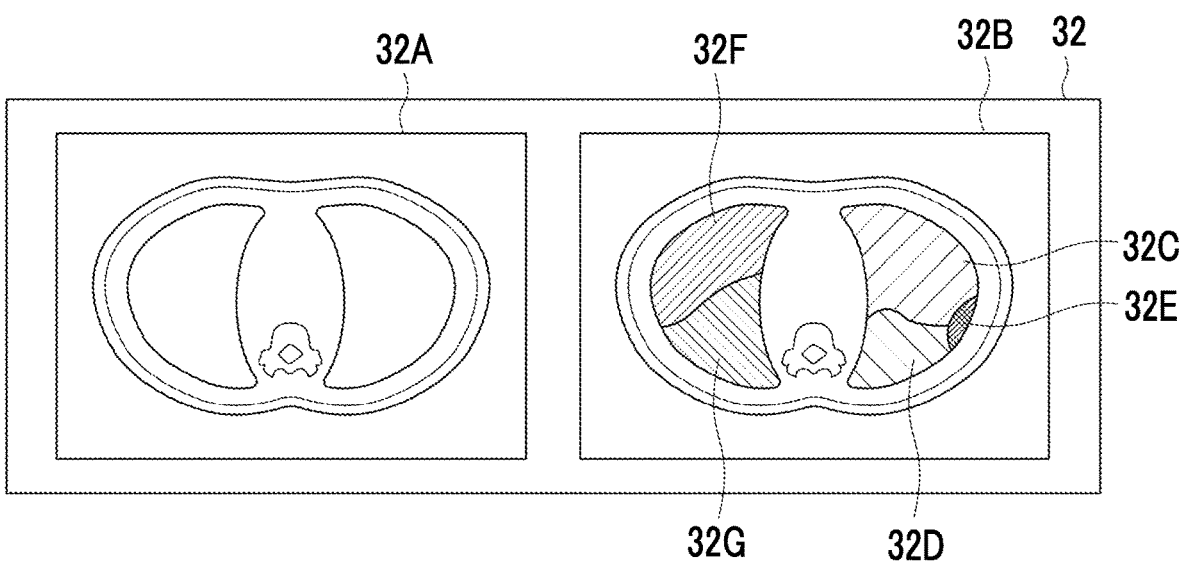
FIG. 10 is a diagram illustrating training data used for training in a second embodiment.

A trained neural network constructed in the second embodiment classifies, for example, a lung region included in a region of an input image into five lobe regions of the upper lobe of the right lung, the middle lobe of the right lung, the lower lobe of the right lung, the upper lobe of the left lung, and the lower lobe of the left lung. For this purpose, in the second embodiment, training data illustrated in FIG. 10 is prepared. As illustrated in FIG. 10, training data 32 used in the second embodiment includes a learning image 32A and a correct answer label 32B. In the correct answer label 32B, different labels 32C, 32D, 32E, 32F, and 32G are given to the upper lobe of the right lung, the middle lobe of the right lung, the lower lobe of the right lung, the upper lobe of the left lung, and the lower lobe of the left lung, respectively. In addition, in the second embodiment, the training data 31 including the correct answer label 31B in which the right lung and the left lung are labeled as illustrated in FIG. 5 is also prepared.

Here, it is possible to easily create the correct answer label illustrated in FIG. 5 in which the labels are given only to the right lung and the left lung. Therefore, it is possible to prepare a large number of training data items 31. On the other hand, since the training data illustrated in FIG. 10 imposes a heavy burden on the creator who creates the correct answer label, it is not possible to prepare a large number of training data items 32. In the second embodiment, a trained neural network is constructed by training the neural network to classify the lungs into five lobe regions even in this situation.

Figure 11:
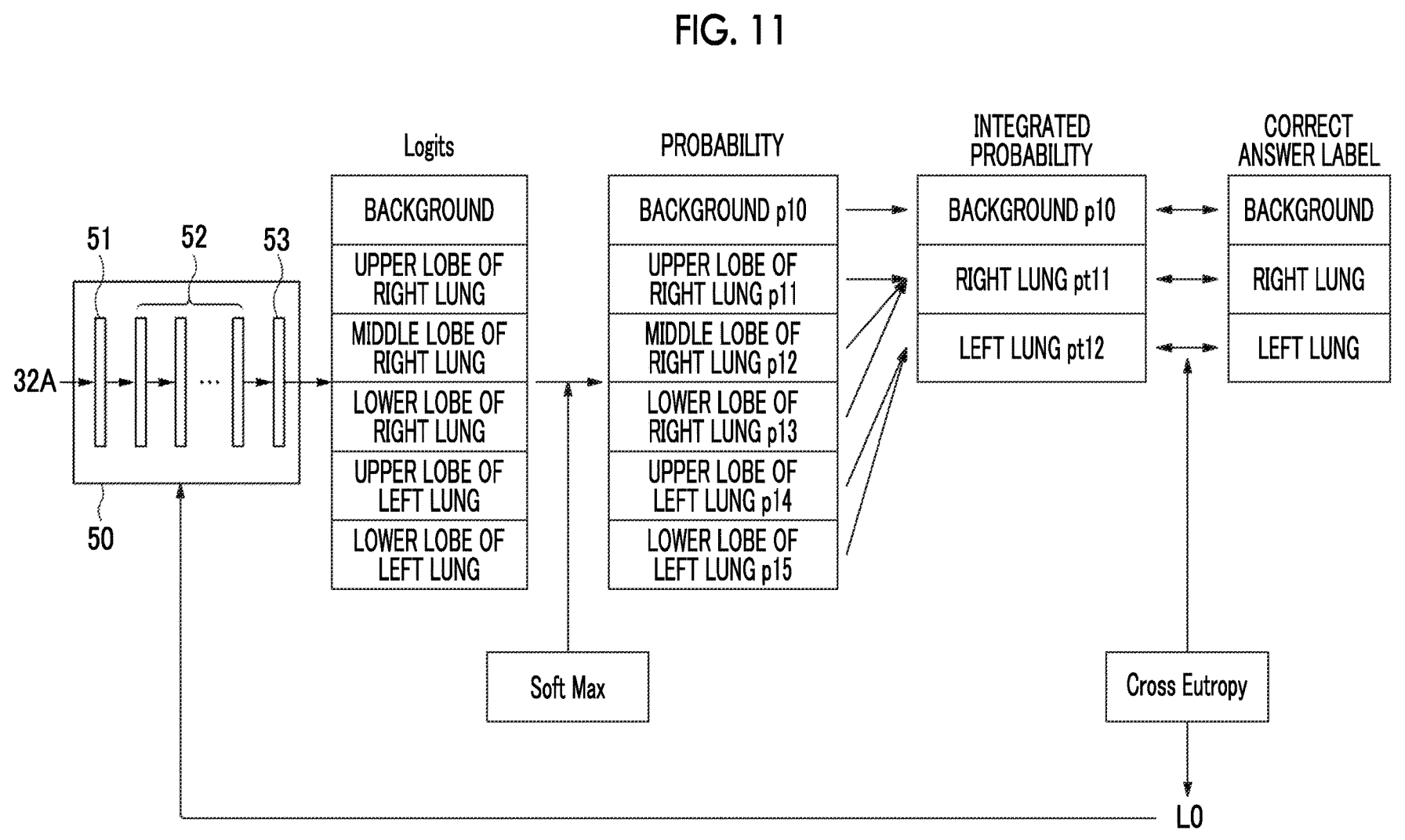

FIG. 11 is a diagram schematically illustrating the training of the neural network in the second embodiment. In addition, a neural network 50 illustrated in FIG. 11 is a convolutional neural network, similarly to the neural network 40 according to the first embodiment, and consists of an input layer 51, a plurality of middle layers 52, and an output layer 53.

In a case in which the learning image 31A is input to the neural network 50, the neural network 50 outputs logits which are values indicating the likelihoods that each pixel included in the learning image 31A will be the background, the upper lobe of the right lung, the middle lobe of the right lung, the lower lobe of the right lung, the upper lobe of the left lung, and the lower lobe of the left lung. For example, the logits having values of (1.0, 3.0, 2.0, 1.5, 3.1, are output for the background, the upper lobe of the right lung, the middle lobe of the right lung, the lower lobe of the right lung, the upper lobe of the left lung, and the lower lobe of the left lung.

The learning unit 22 applies the softmax activation function (Soft Max) to the logits output from the neural network 50 and converts the logits into probabilities p10 to p15. For example, the values of the probabilities (p10, p11, p12, p13, p14, p15)=(0.1, 0.1, 0.1, 0.1, 0.1, are obtained for the background, the upper lobe of the right lung, the middle lobe of the right lung, the lower lobe of the right lung, the upper lobe of the left lung, and the lower lobe of the left lung. In addition, p10+p11+p21+p31+p14+p15=1 is established.

Here, in the correct answer label 31B corresponding to the learning image 31A, the labels are given only to the left lung and the right lung. Therefore, in the second embodiment, the learning unit 22 integrates the derived probabilities on the basis of the classes classified by the correct answer label of the training data. For example, in a case in which the learning image 31A is input to the neural network 50, the probabilities p11, p12, and p13 of the upper lobe of the right lung, the middle lobe of the right lung, and the lower lobe of the right lung among the derived probabilities are integrated into a probability pt11 of the right lung, and the probabilities p14 and p15 of the upper lobe of the left lung and the lower lobe of the left lung are integrated into a probability pt12 of the left lung. In this case, pt11=p11+p12+p13 and pt12=p14+p15 are established. Therefore, in the case of the probabilities (p10, p11, p12, p13, p14, p15)=(0.1, 0.1, 0.1, 0.1, 0.1, 0.5), an integrated probability (p10, pt11, pt12)=(0.1, 0.3, 0.6) is established.

The learning unit 22 derives a cross entropy error as the loss L0 using the probability distribution on the basis of the integrated probability and the correct answer label. The cross entropy error corresponds to the distance between the probability distribution and the vector represented by the correct answer label. Here, in the correct answer label 31B of the input learning image 31A, the labels are given to the left lung region and the right lung region. Therefore, the vector of the correct answer label for deriving the loss from the integrated probability is (0, 1, 0) in the case of the right lung and is (0, 0, 1) in the case of the left lung.

The learning unit 22 trains the neural network 50 until the loss L0 satisfies an end condition. The end condition is the same as that in the first embodiment.

Figure 12:
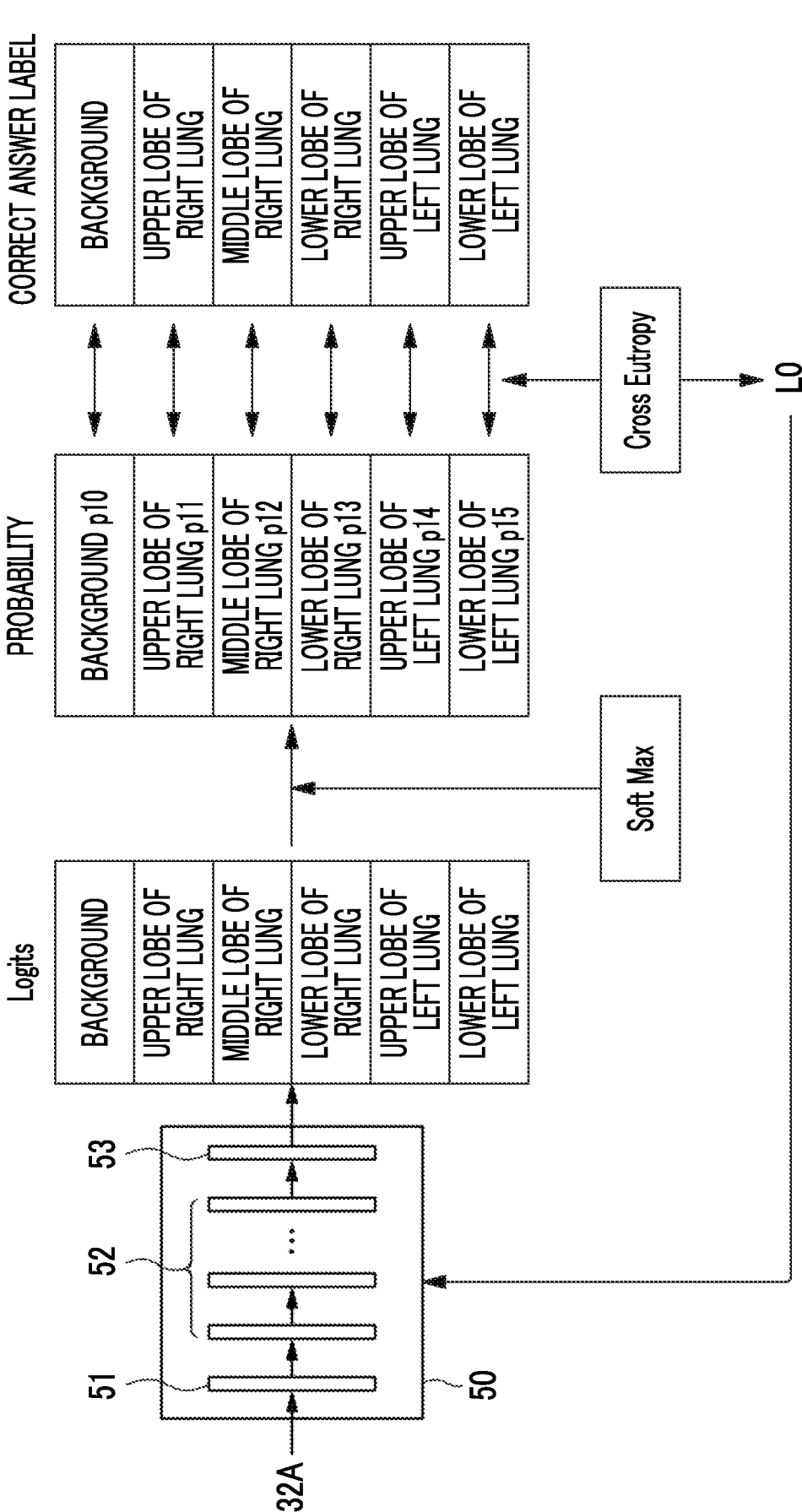
FIG. 12 is a diagram schematically illustrating the training of the neural network according to the second embodiment.

Further, in a case in which the learning image 32A illustrated in FIG. 10 is input to the neural network 50, the labels are given to the upper lobe of the right lung, the middle lobe of the right lung, the lower lobe of the right lung, the upper lobe of the left lung, and the lower lobes of the left lung in the correct answer label 32B of the learning image 32A. In this case, the learning unit 22 derives the loss L0 between the probability and the correct answer label without integrating the probability distributions (p10, p11, p12, p13, p14, p15) as illustrated in FIG. 12 and trains the neural network 50. In this case, the vector of the correct answer label is (1, 0, 0, 0, 0, 0) in the case of the background, is (0, 1, 0, 0, 0, 0) in the case of the upper lobe of the right lung, is (0, 0, 1, 0, 0, 0) in the case of the middle lobe of the right lung, is (0, 0, 0, 1, 0, 0) in the case of the lower lobe of the right lung, is (0, 0, 0, 0, 1, 0) in the case of the upper lobe of the left lung, and is (0, 0, 0, 0, 0, 1) in the case of the lower lobe of the left lung.

In a case in which a CT image is input to the trained neural network constructed by machine learning, the trained neural network outputs the probabilities that each pixel of the CT image will be the upper lobe of the right lung, the middle lobe of the right lung, the lower lobe of the right lung, the upper lobe of the left lung, the lower lobe of the left lung, and the background. Therefore, the use of the trained neural network constructed by the learning device according to the second embodiment makes it possible to classify the CT image into a region having the maximum probability for each pixel.

In addition, in the second embodiment, the lungs are classified into the five lobe regions. However, the object to be classified is not limited thereto. For example, the learning device according to the second embodiment can also be applied to a case in which a trained neural network that classifies the liver into eight liver sections S1 to S8 is constructed. In this case, the neural network can be trained in the same manner as in the second embodiment by integrating the sections S1 to S3 into the left lobe of the liver and by integrating the sections S4 to S8 into the right lobe of the liver. In addition, in a case in which a neural network that classifies bones into a skull, a spine, a rib, a shoulder blade, a pelvis, an arm, and a leg is trained, the neural network can be trained in the same manner as in the second embodiment by integrating the skull, the spine, the rib, the shoulder blade, and the arm into an upper body skeleton and by integrating the pelvis and the leg into a lower body skeleton.

Further, in each of the above-described embodiments, the liver region and the lung region included in the image are classified. However, the present disclosure is not limited thereto. The technology of the first embodiment can also be applied to a case in which any parts of the human body, such as a heart, a brain, a kidney, bones, and limbs, included in the image are classified in addition to the liver and the lung.

Further, in the above-described embodiments, the CT image is used as the image to be classified into the classes. However, the present disclosure is not limited thereto. It is possible to construct a trained neural network that uses any image, such as a radiographic image acquired by simple imaging, as the learning image in addition to a three-dimensional image, such as an MRI image, and classifies a region in any image into a plurality of types of classes.

In addition, in the above-described embodiments, the trained neural network that classifies a region in the medical image into a plurality of types of classes is constructed. However, the present disclosure is not limited thereto. The technology of this embodiment can also be applied to a case in which expression media, such as a photographic image, a video image, voice, and text, other than the medical image are classified into a plurality of types of classes.

Further, in the above-described embodiments, for example, the following various processors can be used as a hardware structure of processing units that perform various processes, such as the information acquisition unit 21 and the learning unit 22. The various processors include a CPU which is a general-purpose processor executing software (program) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs or a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured by using one or more of the various processors as a hardware structure.

In addition, specifically, an electric circuit (circuitry) obtained by combining circuit elements, such as semiconductor elements, can be used as the hardware structure of the various processors.

What is claimed is:

1. A learning device for performing machine learning on a neural network that classifies an expression medium into three or more types of classes, the learning device comprising:

at least one processor, wherein the processor is configured to:

acquire training data that consists of a learning expression medium and a correct answer label for at least one of a plurality of types of classes included in the learning expression medium, wherein the learning expression medium is an image and the plurality of types of classes are a plurality of regions including a background in the image;

input the learning expression medium to the neural network such that probabilities that each class included in the learning expression medium will be each of the plurality of types of classes are output;

integrate the probabilities that each class will be each of the plurality of types of classes on the basis of classes classified by the correct answer label of the training data;

train the neural network on the basis of a loss derived from the integrated probability and the correct answer label of the training data; and add probabilities of classes other than the classes classified by the correct answer label for the learning expression medium and a probability of the background among the probabilities that the classes will be the plurality of types of classes to integrate the probabilities that each class will be each of the plurality of types of classes.

2. The learning device according to claim 1, wherein the classes classified by the correct answer label include two or more of the plurality of types of classes, and the processor is configured to add probabilities of the two or more classes classified by the correct answer label among the probabilities that the classes will be the plurality of types of classes to integrate the probabilities that each class will be each of the plurality of types of classes.

3. The learning device according to claim 1, wherein the processor is configured to train the neural network using a plurality of training data items having different correct answer labels.

4. A learning method for performing machine learning on a neural network that classifies an expression medium into three or more types of classes, the learning method comprising:

acquiring training data that consists of a learning expression medium and a correct answer label for at least one of a plurality of types of classes included in the learning expression medium, wherein the learning expression medium is an image and the plurality of types of classes are a plurality of regions including a background in the image;

inputting the learning expression medium to the neural network such that probabilities that each class included in the learning expression medium will be each of the plurality of types of classes are output;

integrating the probabilities that each class will be each of the plurality of types of classes on the basis of classes classified by the correct answer label of the training data;

training the neural network on the basis of a loss derived from the integrated probability and the correct answer label of the training data; and adding probabilities of classes other than the classes classified by the correct answer label for the learning expression medium and a probability of the background among the probabilities that the classes will be the plurality of types of classes to integrate the probabilities that each class will be each of the plurality of types of classes.

5. A non-transitory computer-readable storage medium that stores a learning program causing a computer to execute a learning method for performing machine learning on a neural network that classifies an expression medium into three or more types of classes, the learning program causing the computer to execute:

a procedure of acquiring training data that consists of a learning expression medium and a correct answer label for at least one of a plurality of types of classes included in the learning expression medium, wherein the learning expression medium is an image and the plurality of types of classes are a plurality of regions including a background in the image;

a procedure of inputting the learning expression medium to the neural network such that probabilities that each class included in the learning expression medium will be each of the plurality of types of classes are output;

a procedure of integrating the probabilities that each class will be each of the plurality of types of classes on the basis of classes classified by the correct answer label of the training data;

a procedure of training the neural network on the basis of a loss derived from the integrated probability and the correct answer label of the training data; and a procedure of adding probabilities of classes other than the classes classified by the correct answer label for the learning expression medium and a probability of the background among the probabilities that the classes will be the plurality of types of classes to integrate the probabilities that each class will be each of the plurality of types of classes.

* * * * *